(No Model.) 3 Sheets—Sheet 1.

J. F. & W. C. CAMERON.
CHURN.

No. 305,570. Patented Sept. 23, 1884.

WITNESSES
P. W. Hale
W. B. Hale

INVENTORS,
Joseph F. Cameron,
William C. Cameron,
by J. M. Yznaga, Attorney.

(No Model.) 3 Sheets—Sheet 2.
J. F. & W. C. CAMERON.
CHURN.
No. 305,570. Patented Sept. 23, 1884.
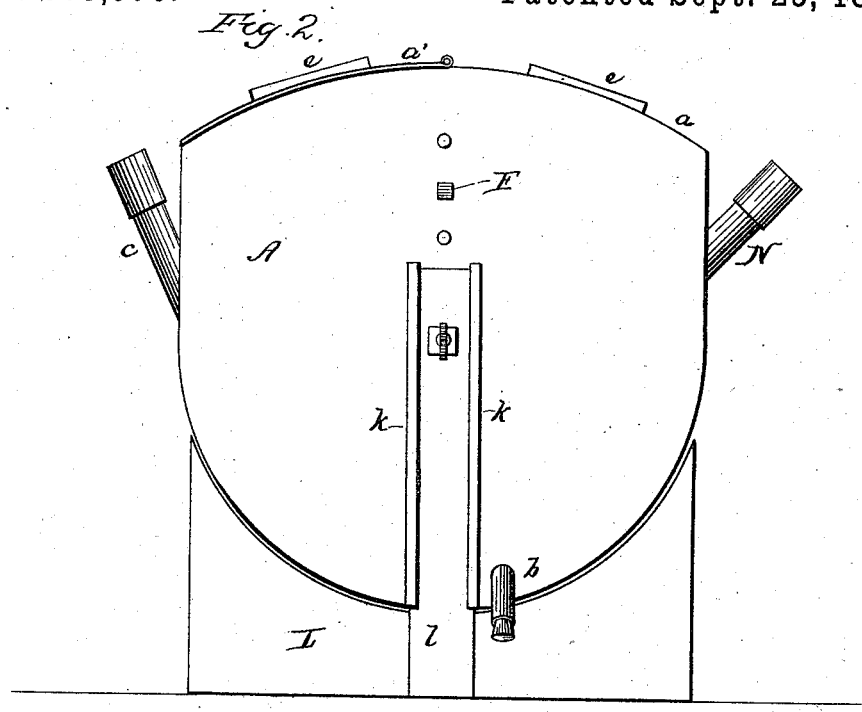
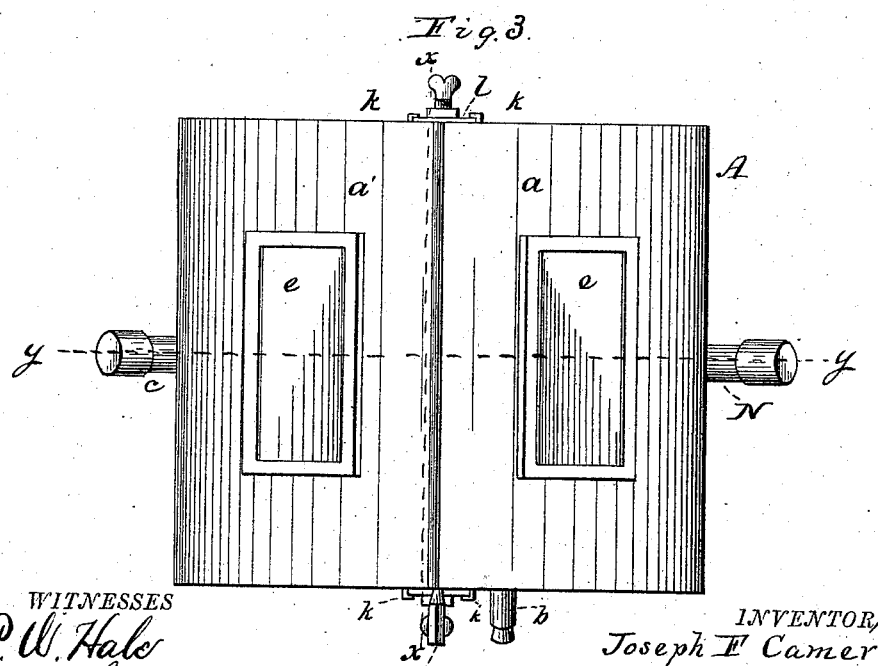
WITNESSES
P. W. Hale
W. B. Hale
INVENTORS,
Joseph F. Cameron,
William C. Cameron,
by J. M. Yznaga, Attorney (No Model.) 3 Sheets—Sheet 3.

J. F. & W. C. CAMERON.
CHURN.

No. 305,570. Patented Sept. 23, 1884.

WITNESSES
P. W. Hale
W. B. Hale.

INVENTORS,
Joseph F. Cameron,
William C. Cameron,
by J. M. Yznaga, Attorney

UNITED STATES PATENT OFFICE.

JOSEPH F. CAMERON AND WILLIAM C. CAMERON, OF TROY, ALA., ASSIGNORS OF ONE-THIRD TO GEORGE C. COX, OF HOT SPRINGS, ARK.

CHURN.

SPECIFICATION forming part of Letters Patent No. 305,570, dated September 23, 1884.

Application filed May 5, 1884. (No model.)

*To all whom it may concern:*

Be it known that we, JOSEPH F. CAMERON and WILLIAM C. CAMERON, citizens of the United States of America, residing at Troy, in the county of Pike and State of Alabama, have invented certain new and useful Improvements in Churns; and we do hereby declare the following to be a full, clear, and exact description of the invention, such as will enable others skilled in the art to which it appertains to make and use the same.

Our invention relates to a churn provided with a horizontal rotary dasher, and adapted to be operated by either mechanical or manual power. It comprises novel features by means of which the horizontal dasher may be adjusted vertically in accordance with the depth of the milk, and the body of the churn may be adjusted vertically to suit the adjustment of the dasher, so that when the dasher is raised or lowered to properly strike the milk or cream the churn-body may be adjusted vertically to bring the dasher to a proper level for connection with a motor, or for convenience of operation by a crank.

The invention consists in certain novel constructions and combinations of devices, which may be fully understood from the following particular description, in connection with the accompanying drawings, and which will be particularly pointed out in the appended claims.

Figure 1:
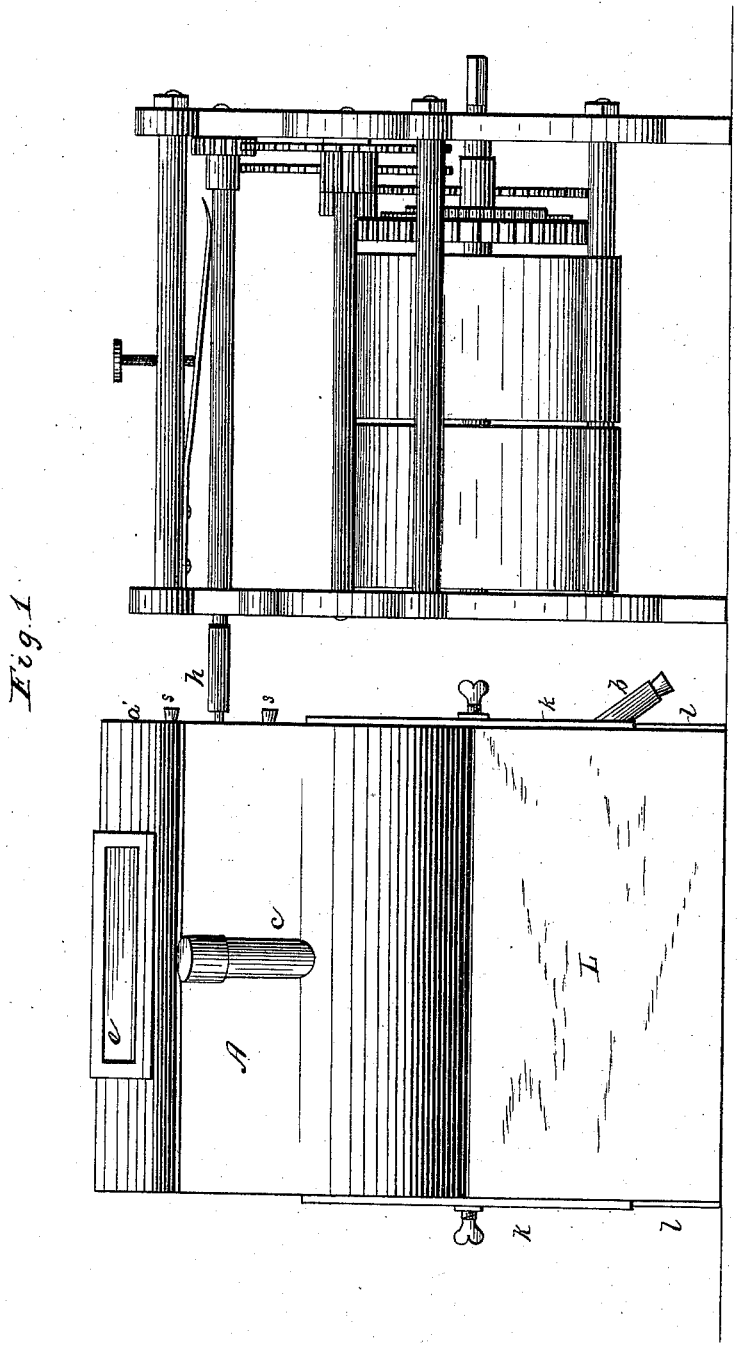
Figure 4:
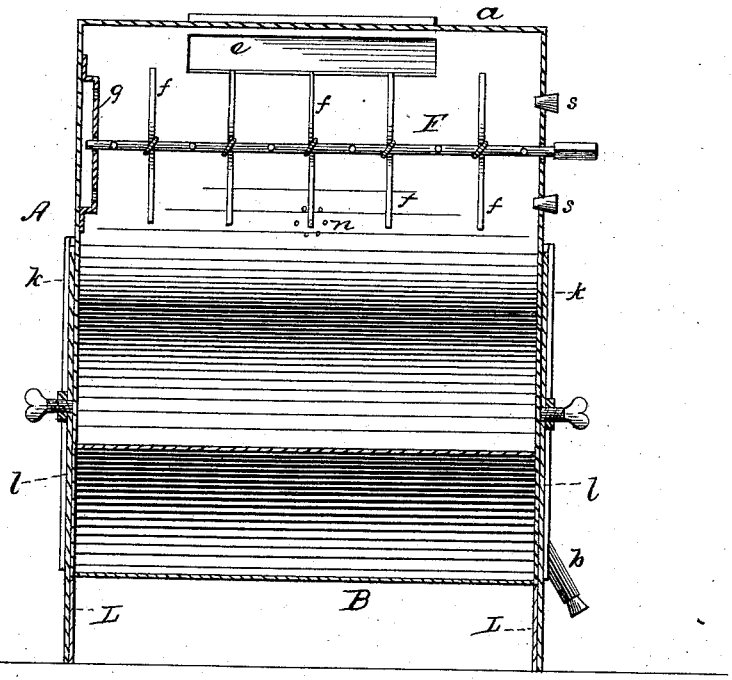
Figure 5:
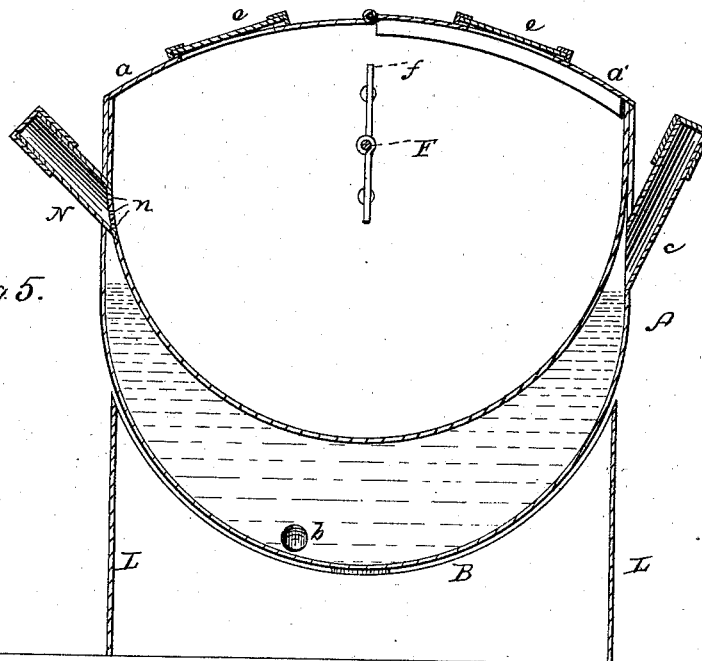

In the drawings, Figure 1 is a side view of our improved churn, connected with a motor for driving the same. Fig. 2 is an end view of the churn. Fig. 3 is a top view. Fig. 4 is a longitudinal vertical section on the line $x\,x$ of Fig. 3, and Fig. 5 is a cross-section on the line $y\,y$ of Fig. 3.

The letter A designates the churn-body, which may be made of either wood or sheet metal, and has its lower portion embraced by a water-jacket, B, provided at one upper edge with an inlet, $c$, and at its bottom with an outlet spout, $b$. The top of the churn-body is covered by a permanent top plate, $a$, and the hinged door $a'$. In both the top plate and hinged door are set, as heretofore, panes of glass $e$, through which the interior of the churn may be observed without opening the door, so that the operator may at all times have knowledge of the progress of the operation without retarding it, as would necessarily be the case were the door opened each time when inspection was desired. Within the churn-body is arranged a horizontal rotary dasher, F, with radial projecting dasher-arms $f$. The dasher-rod has bearings at one end in a bracket, $g$, secured to the inner surface of the churn-wall, and the other end projects outwardly through bearings in the opposite wall, its outwardly-projecting end being squared, as shown, or otherwise formed to receive a crank or a thimble, $h$, as shown in Fig. 1, for connecting it to the driving-shaft of the motor. The bracket $g$ and the opposite end wall of the churn are provided with a vertical series of bearings, so that the dasher may be adjusted up or down, according to the depth of the milk within the churn. We usually so adjust the dasher that the tips of its radial arms will dip only about an inch, more or less, as we find this dipping sufficient to efficiently break up the butter-globules and create an upward circulation sufficient to bring a constant fresh current of milk under the action of the dasher. The bearings in the end wall of the churn, which are not at any time occupied by the dasher, we keep closed by means of suitable stoppers, as at $s$. On the outer surfaces of the respective end walls of the churn-body are vertical guides, such as shown at $k$, which embrace the edges of the vertical standards $l$, projecting from the base L. These standards are provided with clamp-screws, which pass through them and bear upon the churn-walls to hold the body at any desired elevation.

It will be seen that whatever adjustment is given to the dasher the body of the churn may be adjusted correspondingly, so that the dasher may be coupled to a motor-shaft, or its height may be regulated to suit the convenience of a person operating it by a crank.

At one side of the churn-body, above the water-jacket, are formed a series of perforations, $n$, which open into an outwardly-projecting spout, N, so that by tilting the churn the buttermilk may be poured off and the butter retained, thus greatly facilitating the gathering of the flakes or lumps of butter after the churning is completed.

It is frequently necessary in the process of churning to either warm or cool the milk, as is well known, in order to facilitate the operation of butter-making, and such regulation of temperature of the milk may be accomplished in the usual manner by pouring either hot or cold water, as the case may be, into the water-jacket B through its side spout. This water may be drawn off through the bottom spout when necessary.

We preferably form the body of the churn much longer in length than in depth, in order that a suitable surface of milk may be exposed to the action of the dasher in proportion to its quantity, as we find that the production of butter at the surface of the milk is much greater than below it.

We are aware that rotary churns and other vessels have been provided with strainers of various kinds for straining off buttermilk, and we lay no claim, broadly, to a churn or other vessel so provided.

We are also aware that a rotary churn has been provided with a vertically-adjustable horizontal dasher, and that various kinds of vessels are supported by standards upon which they are vertically adjustable. We therefore lay no claim to such churns or vessels, broadly.

Having now fully described our invention, what we claim is—

1. In combination with the churn-body, a horizontal rotary dasher the shaft of which projects at one end, means by which said dasher may be vertically adjusted, the guides $k$, vertical standards $l$, and the clamp-screws whereby the height of the churn may be regulated to suit the adjustment of the dasher, substantially as described.

2. The herein-described churn, comprising the base L and vertical standards $l$, the churn-body A, provided at each end with guides $k$, and having on its interior perforations $n$, the clamp-screws for securing the said body upon the standards, the water-jacket surrounding the bottom of the churn, the spouts N and C, the dasher F, and means whereby said dasher may be vertically adjusted, the parts being combined and operated as described.

In testimony whereof we affix our signatures in presence of two witnesses.

JOSEPH F. CAMERON.
WILLIAM C. CAMERON.

Witnesses:
BENJAMIN H. ENGRAM,
WILLIAM A. CROSSLY.